UNITED STATES PATENT OFFICE.

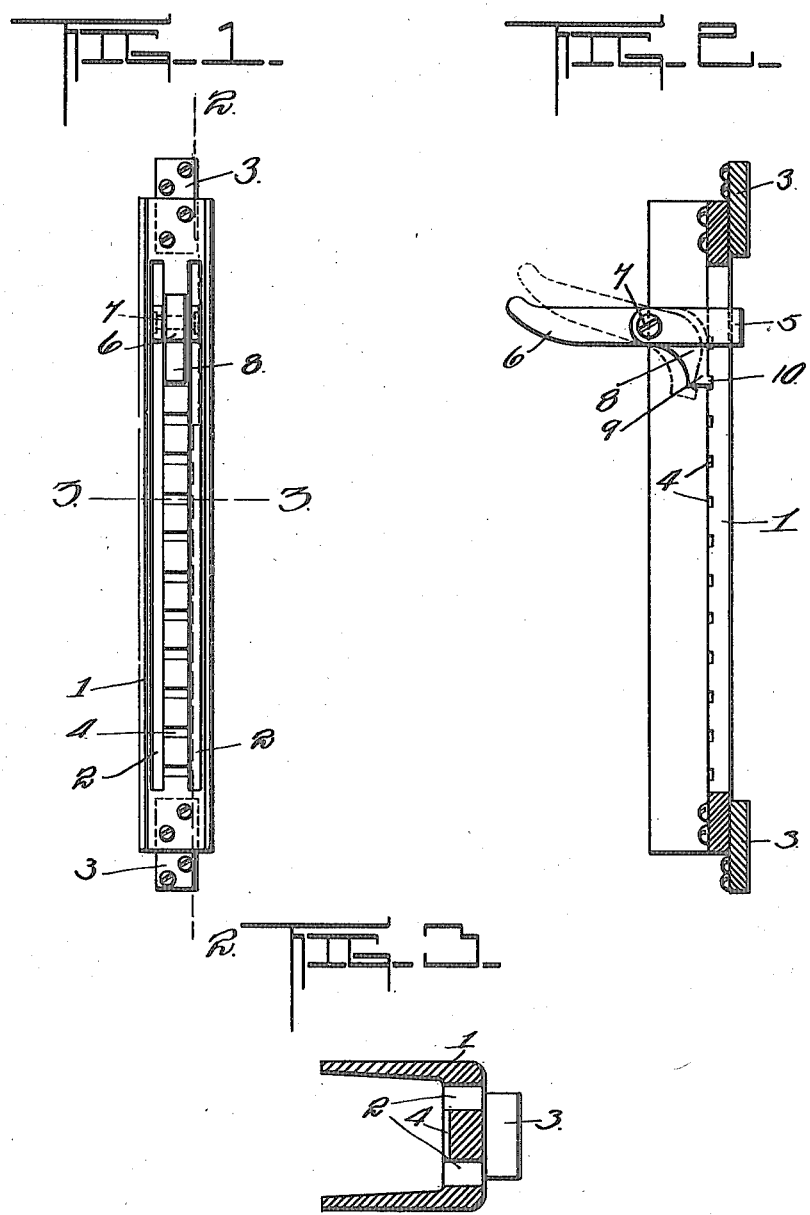

GILBERT T. MOEN, OF ELEVA, WISCONSIN.

ADJUSTABLE HARNESS-HOOK.

1,264,837.　　　　　Specification of Letters Patent.　　Patented Apr. 30, 1918.

Application filed May 17, 1917. Serial No. 169,288.

*To all whom it may concern:*

Be it known that I, GILBERT T. MOEN, a citizen of the United States, residing at Eleva, in the county of Trempealeau and State of Wisconsin, have invented certain new and useful Improvements in Adjustable Harness-Hooks, of which the following is a specification.

This invention relates to new and useful improvements in supporting brackets and more particularly to harness supports and the principal object of the invention is to provide a device of this character with means for adjusting the position thereof.

Another object of the invention is to provide the device with a cam arrangement so that the weight of the supported article tends to make the supporting hook engage its support more firmly.

A further object of the invention is to provide the supporting hook with means for detachably engaging its supporting member so the hook must be raised to disengage it therefrom.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:

Figure 1 is a front view of the invention.

Fig. 2 is a longitudinal sectional view, on line 2—2 of Fig. 1.

Fig. 3 is a section on line 3—3 of Fig. 1.

In these figures 1 indicates the supporting bar made of U shape in cross section and having its legs tapering outwardly as shown in Fig. 3 and its transverse member thickened and provided with a pair of longitudinal transversely spaced slots 2. This bar has a plate 3 secured to each end thereof by screws or the like, and these plates are to be secured to a suitable support. The attaching plates 3 connect the member 1 so that there is a space between said member and its support. The part of the transverse portion of the member 1 lying between the slots 2 is provided with a series of transversely extending longitudinally spaced grooves 4. 5 indicates a loop or clip of U shape having its legs extending through the slots 2 and its cross bar engaging the member 1 as shown. 6 represents the article receiving hook in the form of an L-shaped lever fulcrumed between the legs of the clip 5 by means of a screw 7. This hook is provided with a laterally extending cam like head 8 having a longitudinally extending nose 10 at its free end 9, said nose being designed to interlockingly engage the grooves 4. The outer end of the lever is upturned to hold harness or other articles to be supported thereon.

To adjust the position of the hook on the supporting member 1 the said hook is raised to the position shown in dotted lines in Fig. 2, thereby disengaging toe 10 and permitting the member 5 to slide on the member 1. After the proper position is reached the hook 6 is lowered so as to clamp the member 1 between the cross bar of clip 5 and the cam 8 thus holding the hook firmly in position, with its nose 10 engaging the groove 4 and provides an additional means for preventing movement of the hook.

If desired, I may make the member 1 of sufficient length to accommodate two or more hooks so as to support several different sets of harness.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:

An article supporting rack comprising a bar, U-shaped in cross section with transversely spaced, longitudinally extending slots, in the intermediate member thereof, the portion between said slots having longitudinally spaced, transversely extending grooves in its inner face, a U-shaped clip having its legs extended inwardly through said slots and adapted to slide on said intermediate member of the bar between the slots therein, a substantially L-shaped lever fulcrumed intermediate the ends of its long arm between the free ends of the legs of said clip, said lever having a cam at the junction of its arms on its outer edge, the short arm of the lever having a laterally projecting, outwardly extending nose for interlocking engagement with said grooves to provide auxiliary locking means for holding the lever in adjusted position, the long arm of the lever projecting laterally when in operative position from said bar to receive articles to be supported.

In testimony whereof I affix my signature in presence of two witnesses.

GILBERT T. MOEN.

Witnesses:
 CRISSA LITTLE,
 ELMER OLSON.